United States Patent
Costanzo et al.

(10) Patent No.: US 9,079,717 B1
(45) Date of Patent: Jul. 14, 2015

(54) CONVEYOR SYSTEMS FOR DIVERTING OBJECTS

(71) Applicant: Laitram, L.L.C., Harahan, LA (US)

(72) Inventors: Mark Costanzo, River Ridge, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/151,034

(22) Filed: Jan. 9, 2014

(51) Int. Cl.
*B65G 17/24* (2006.01)
*B65G 13/04* (2006.01)
*B65G 13/071* (2006.01)
*B65G 47/34* (2006.01)

(52) U.S. Cl.
CPC .............. *B65G 13/071* (2013.01); *B65G 13/04* (2013.01); *B65G 17/24* (2013.01); *B65G 47/34* (2013.01)

(58) Field of Classification Search
CPC ................................. B65G 17/24; B65G 47/34
USPC .......................................................... 198/779
See application file for complete search history.

(56) References Cited

U.S. PATENT DOCUMENTS

| | | | |
|---|---|---|---|
| 5,145,049 A | 9/1992 | McClurkin | |
| 6,044,956 A | 4/2000 | Henson et al. | |
| 6,073,747 A | 6/2000 | Takino et al. | |
| 6,318,544 B1 | 11/2001 | O'Connor et al. | |
| 6,571,937 B1 | 6/2003 | Costanzo et al. | |
| 6,923,309 B2 | 8/2005 | Costanzo | |
| 6,968,941 B2 | 11/2005 | Fourney | |
| 7,040,478 B2 | 5/2006 | Ehlert | |
| 7,191,894 B2 | 3/2007 | Costanzo et al. | |
| 7,237,670 B1 | 7/2007 | Ryan et al. | |
| 7,249,669 B2 | 7/2007 | Fourney | |
| 7,284,653 B2 | 10/2007 | Fourney et al. | |
| 7,311,192 B2 | 12/2007 | Fourney | |
| 7,344,018 B2 | 3/2008 | Costanzo et al. | |
| 7,360,641 B1 | 4/2008 | Fourney | |
| 7,506,751 B2 | 3/2009 | Fourney | |
| 7,971,701 B2 * | 7/2011 | Fourney | 198/370.09 |
| 8,167,118 B2 * | 5/2012 | Fourney | 198/779 |
| 2008/0169171 A1 | 7/2008 | Itoh et al. | |
| 2011/0005903 A1 | 1/2011 | Niewiera | |
| 2011/0022221 A1 * | 1/2011 | Fourney | 700/230 |
| 2013/0240330 A1 * | 9/2013 | Schwai | 198/779 |

FOREIGN PATENT DOCUMENTS

| | | |
|---|---|---|
| JP | 03-088617 A | 4/1991 |
| JP | 04243717 A | 8/1992 |

OTHER PUBLICATIONS

International Search Report and Written Opinion of the International Searching Authority, PCT/US2014/071878, mailed Apr. 21, 2015, Korean Intellectual Property Office, Republic of Korea.

* cited by examiner

*Primary Examiner* — Mark A Deuble
(74) *Attorney, Agent, or Firm* — James T. Cronvich

(57) ABSTRACT

A conveyor system including a conveyor belt having a plurality of conveyor belt rollers configured to divert objects on the conveyor belt. A roller drive mechanism engages the conveyor belt rollers to actuate the conveyor belt rollers into rotation as the conveyor belt advances. The drive mechanism is adjustable to cause the conveyor belt rollers to rotate in a first angular direction and a second, opposite angular direction so that objects can be selectively diverted to either side of the conveyor belt at a desired diverting angle. The roller drive mechanism has drive rollers mounted in cartridges with pinion gears engaged by rack gears to adjust the orientation of the drive rollers relative to the belt rollers and the engagement of the belt rollers with the drive rollers as a function of the orientation by selective raising and lowering or laterally shifting the drive rollers.

18 Claims, 17 Drawing Sheets

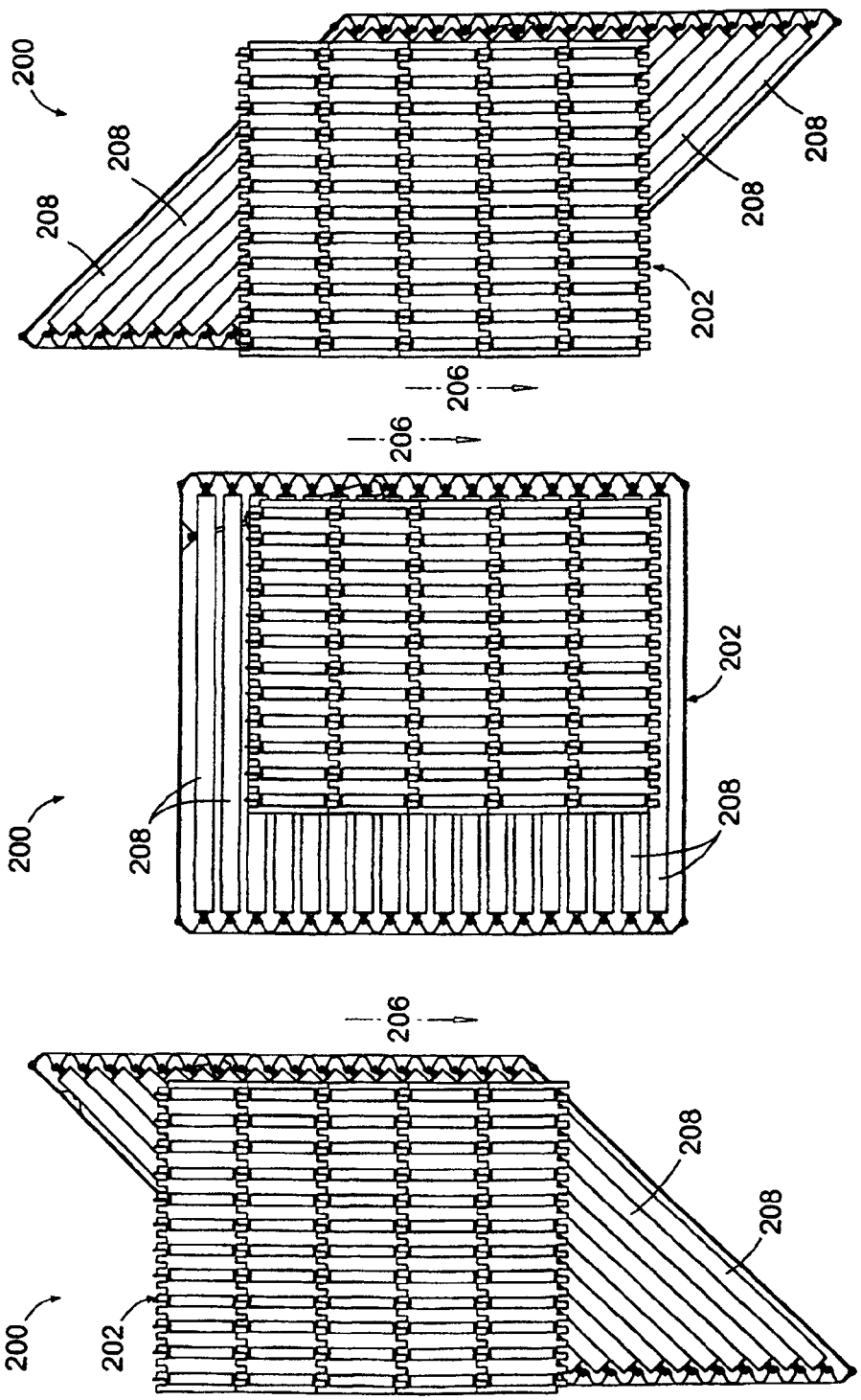

CONVEYOR SYSTEMS FOR DIVERTING OBJECTS

BACKGROUND

The invention relates generally to power-driven conveyors and, more particularly, to conveyor systems having conveyor belts with object-supporting rollers rotated by contact with a drive mechanism having freely rotatable drive rollers whose orientations are changeable to cause the object-supporting rollers to rotate in one direction or another.

It is often necessary to divert objects from a conveyor belt, for example to another conveyor belt, for purposes of routing or positioning the objects for processing of one type or another.

U.S. Pat. No. 7,506,751, Mar. 24, 2009, to Matthew L. Fourney describes a conveyor system for diverting objects carried atop a conveyor belt having object-supporting rollers. As the conveyor belt advances in a direction of belt travel, the belt rollers ride on freely rotatable drive rollers supporting the conveyor belt from below. The belt rollers are arranged in lanes and rotate on axes parallel to the direction of bet travel. The drive rollers are mounted in pivotable cartridges. An actuator coupled to the cartridges pivots the cartridges and the drive rollers in place and in contact with the belt rollers. When the drive rollers are pivoted to oblique angles relative to the conveyor belt rollers, the belt rollers are rotated to direct conveyed objects toward one side of the conveyor belt or the other depending on the angle of the roller relative to the direction of belt travel. The belt rollers are braked by pivoting the drive rollers perpendicular to the belt rollers so that the belt rollers don't rotate. But, when the belt rollers are braked, the contact between the belt rollers and the drive rollers causes a lot of noise. Also, the braked rollers do not always perfectly brake causing some unwanted rotation of the belt roller. Furthermore, the braked rollers' rolling over the drive rollers wears a central groove in the drive rollers.

SUMMARY

One version of a conveyor system embodying features of the invention a conveyor belt having a plurality of conveyor belt rollers configured to divert objects atop the rollers as the belt advances and a roller drive mechanism. The roller drive mechanism includes a plurality of pivotable cartridges, each having a cartridge gear and a freely rotatable drive roller that contacts the conveyor belt rollers from below. Actuator gears are engaged with the cartridge gears to pivot the cartridges and change the orientation of the drive rollers with respect to the conveyor belt rollers and to move the drive rollers into and out of engagement with the conveyor belt rollers as a function of the orientation of the drive rollers with respect to the conveyor belt rollers. An actuator moves the actuator gears to pivot the cartridges.

Another version of a conveyor system embodying features of the invention comprises a conveyor belt advancing in a direction of belt travel and having a plurality of conveyor belt rollers with axes of rotation parallel to the direction of belt travel and a roller drive mechanism. The roller drive mechanism includes a plurality of pivotable cartridges. Each cartridge has a drive roller freely rotatable about an axis of rotation and disposed below the conveyor belt. An actuator coupled to the plurality of pivotable cartridges pivots the cartridges about a vertical axis to change the direction of the axes of rotation of the drive rollers and to move the drive rollers into and out of contact with the conveyor belt rollers

BRIEF DESCRIPTION OF THE DRAWINGS

The disclosed systems and methods can be understood with reference to the following drawings. The components in the drawings are not necessarily to scale.

FIGS. 10A-10C are top views of the conveyor system of FIG. 9, illustrating angular adjustment of drive rollers of the system to adjust diverting angle.

DETAILED DESCRIPTION

As described above, existing conveyor systems that include conveyor belt rollers, although providing advantages over previous systems, still have limitations. As described in the following, however, such limitations can be overcome with a conveyor system that employs a drive mechanism comprising free-spinning angularly adjustable rollers that control rotation of rollers contained within a conveyor belt. In some embodiments, a conveyor belt comprises a plurality of longitudinally oriented free-spinning rollers that are "driven" through contact with free-spinning angularly adjustable rollers that are positioned below the conveyor belt. In such systems, objects can be diverted at various angles to either side of the conveyor belt through mere actuation of the angularly adjustable rollers. Furthermore, when the angularly adjustable rollers are aligned with the direction of belt travel, the conveyor belt rollers can be braked such that they will not rotate, thereby reducing or eliminating object drift. Moreover, given that the angularly adjustable rollers can be gradually rotated from the braking orientation to a desired diverting angle, the conveyor belt rollers can be gradually accelerated, thereby reducing or eliminating slip.

Figure 1:
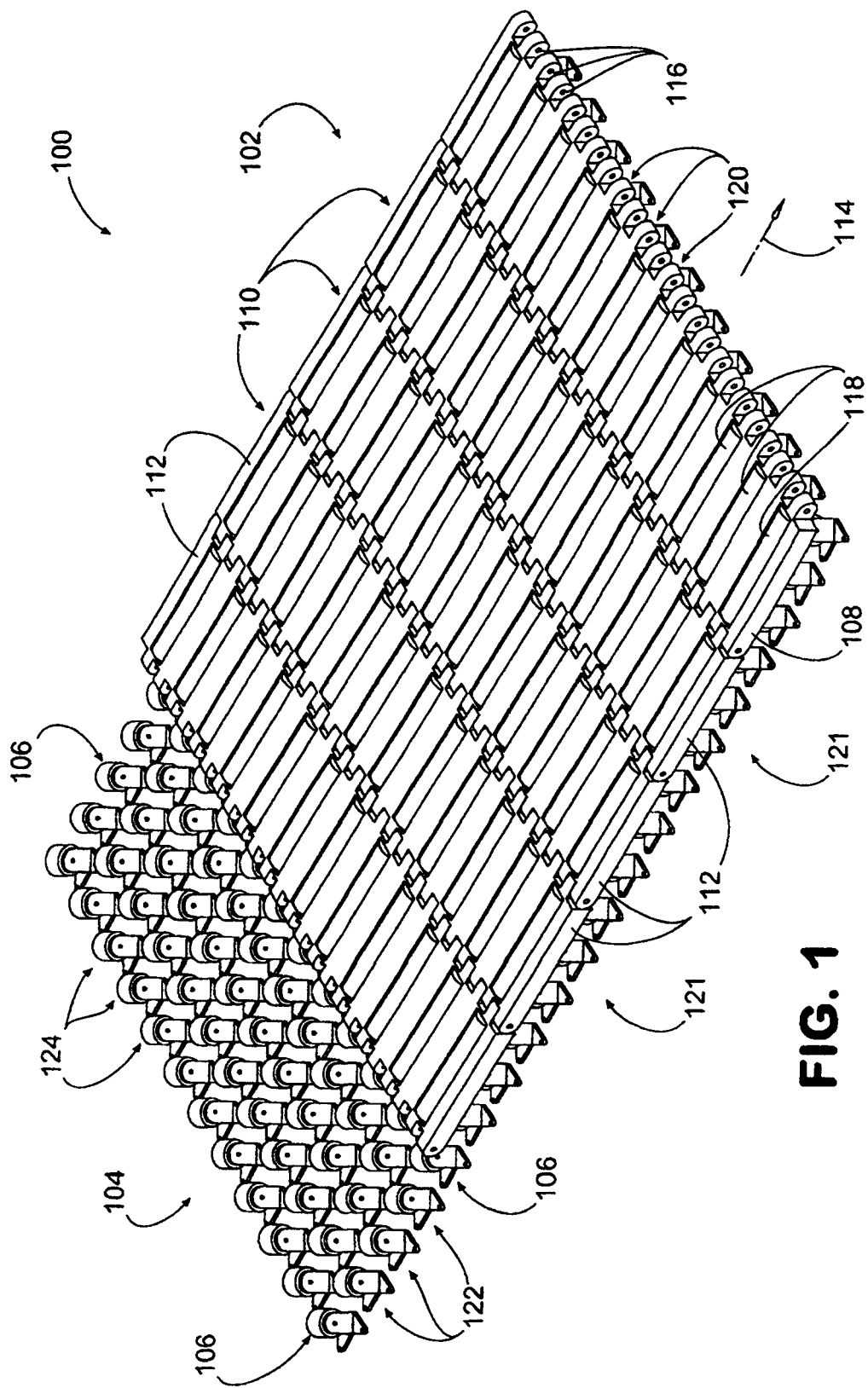
FIG. 1 is a top perspective view of a first embodiment of a portion of a conveyor system.

Referring to the figures, in which like numerals indicate corresponding parts throughout the several views, FIG. 1 illustrates an embodiment of a portion of a conveyor system 100 that can be adjusted to divert objects at various angles to either side of the system. As indicated in FIG. 1, the conveyor system 100 comprises a conveyor belt 102 and a field 104 of angularly adjustable "drive" roller modules 106. In the embodiment of FIG. 1, the conveyor belt 102 comprises a conveyor belt frame 108 that is composed of a plurality of transverse modular conveyor belt sections 110. Within each conveyor belt section 110 is a plurality of elongated conveyor belt links 112 that extend in the direction of belt travel 114 and connect to adjacent conveyor belt links of adjacent conveyor belt sections. By way of example, each conveyor belt link 112 comprises a metal or plastic member having an opening 116 provided at each of its opposed ends that receives a rod or shaft (not shown) that passes through the openings of conveyor belt links of adjacent conveyor belt sections 110 so as to connect the conveyor belt sections to each other.

Interposed between the conveyor belt links 112 are elongated longitudinally oriented free-spinning conveyor belt rollers 118. For the purposes of this disclosure, the term "free-spinning" means that the rollers are free to spin about their axes of rotation in either angular direction. Therefore, the rollers 118 may be said to comprise "idler" rollers that will freely rotate in either angular direction when driven by an appropriate force. In the embodiment of FIG. 1, the rollers 118 are positioned such that their axes of rotation are parallel to the direction of belt travel 114. As shown in FIG. 1, the rollers 118 can be alternately provided along the width of each conveyor belt section 110 in relation to the conveyor belt links 112 such that a roller is positioned between each pair of adjacent conveyor belt links. In such an arrangement, the rollers 118 of the various conveyor belt sections 110 can be arranged in columns 120 that extend in the direction of belt travel 114 and rows 121 that extend across the width of the conveyor belt 102. It is noted that, although the rollers 118 have been described and depicted as being elongated, the rollers need not necessarily be elongated in the direction of their axes of rotation.

Figure 7:
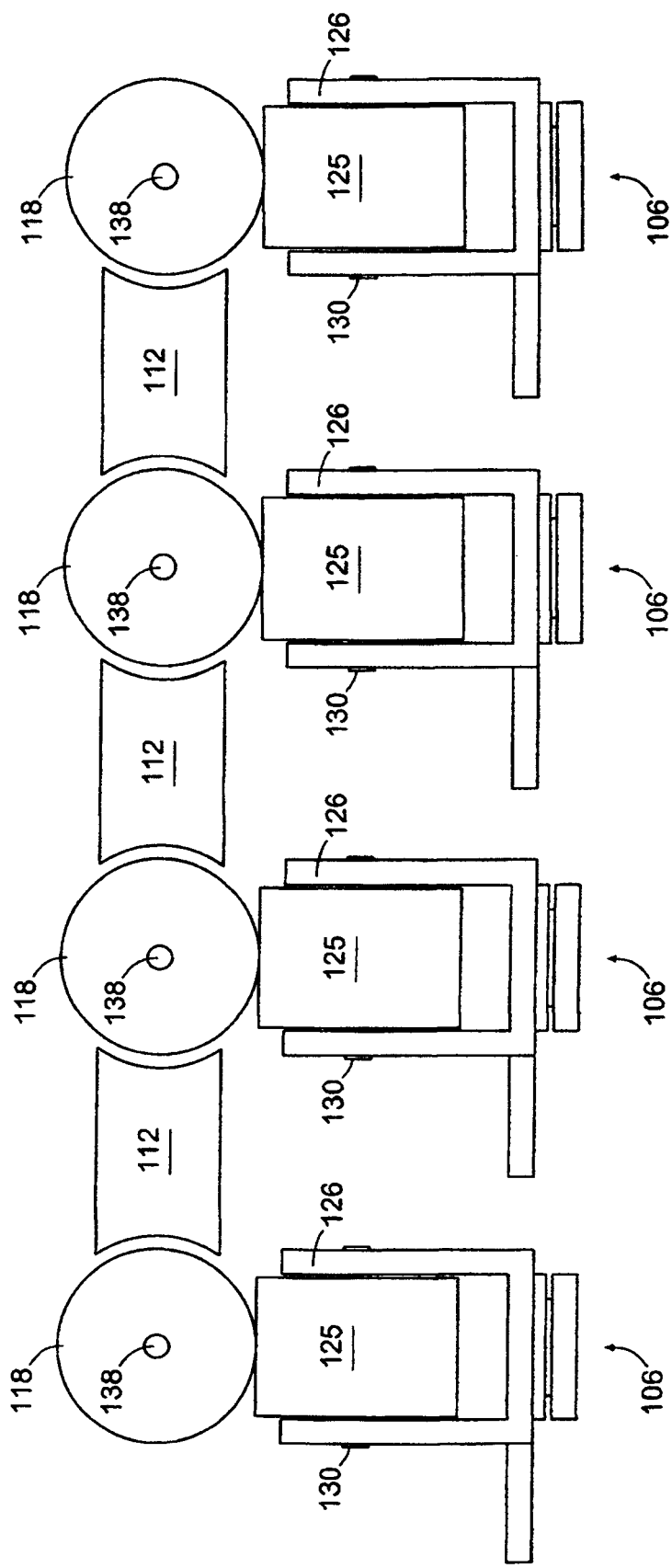
FIG. 7 is an end view of a portion of the conveyor system of FIG. 1, illustrating a braking function provided by angularly adjustable drive rollers of the system.

The conveyor belt rollers 118 are made of metal and/or plastic and are provided with a rubber or plastic high-friction outer layer or coating that prevents slippage when rollers of the roller modules 106 are brought into contact with the conveyor belt rollers. Each roller 118 can connect at each of its ends to the conveyor belt frame 108 and/or to the rods or shafts that connect the various conveyor belt sections 110. As indicated in FIG. 7, the rollers 118 are dimensioned so as to extend beyond the upper and lower surfaces of the conveyor belt frame 108 (and belt links 112) such that they can both divert objects placed on the conveyor belt 102 and can be driven from below by the drive roller modules 106.

With further reference to FIG. 1, the field 104 of angularly adjustable drive roller modules 106 comprises a plurality of rows 122 and columns 124 of drive roller modules. The drive roller modules 106 are positioned such that their columns 124 align with the columns 120 of the conveyor belt rollers 118 and their rows 122, at least intermittently during conveyor system operation, align with rows 121 of conveyor belt rollers. In the first embodiment shown in FIG. 1, the drive roller modules 106 comprise relatively short (in the dimension of their axes of rotation) caster rollers (see FIGS. 2A and 2B) that are positioned closely enough to each other such that at least one drive roller is aligned with any given conveyor belt roller 118 during the operation. Indeed, in the embodiment of FIG. 1, the drive roller modules 106 are positioned closely enough such that at least two drive rollers are positioned adjacent any given conveyor belt roller 118, during conveyor operation.

Figure 2A:
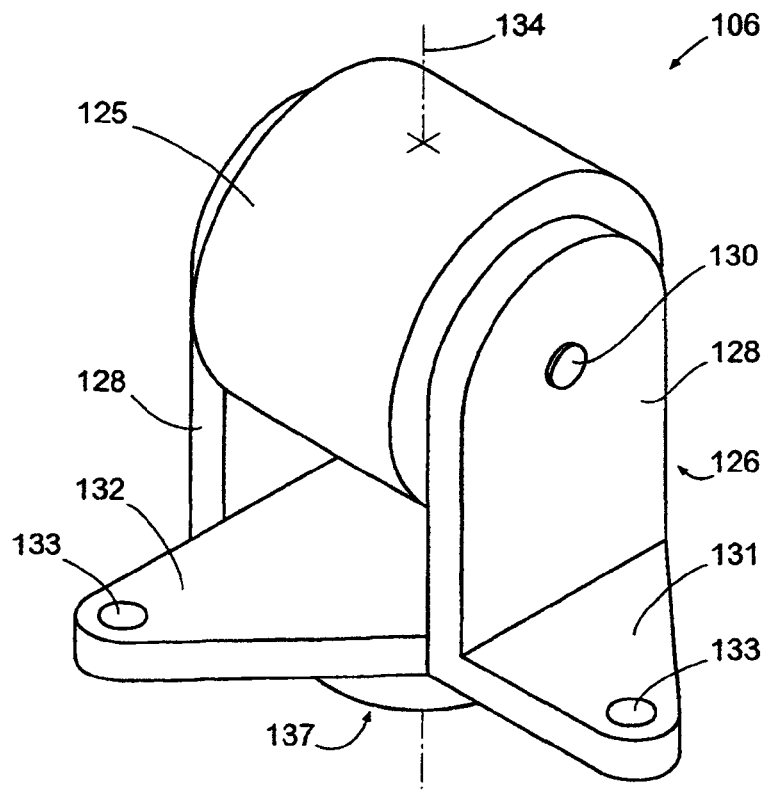
FIG. 2A is a top perspective view of a drive roller module used in the conveyor system of FIG. 1.
Figure 2B:
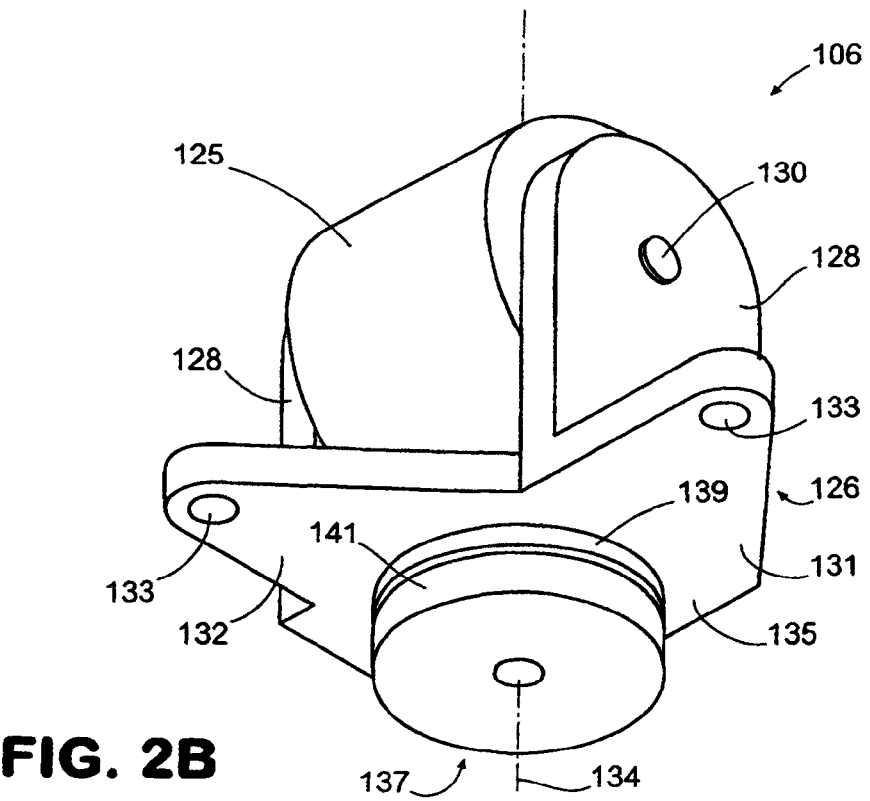
FIG. 2B is a bottom perspective view of a drive roller module used in the conveyor system of FIG. 1.

Turning to FIGS. 2A and 2B, which illustrate perspective views of a single drive roller module 106, each drive roller module includes a free-spinning drive roller 125 that is free to rotate in either angular direction relative to its axis of rotation. Accordingly, although designated as "drive" rollers, the drive rollers 125 are not themselves driven by some mechanical means, such as a motor or the like. By way of example, each drive roller 125 is made of metal and/or plastic and, like the conveyor belt rollers 118, has a rubber or plastic high-friction outer layer or coating.

As shown in FIGS. 2A and 2B, the drive roller 125 is supported within a frame 126 that comprises opposed vertical support members 128. Extending between the support members 128 and through a central opening provided in the drive roller 125 (not shown) is a shaft 130 about which the drive roller can rotate (i.e., the axis of rotation). In addition to the support members 128, the frame 126 comprises first and second control arms 131 and 132 that, as described below, can be used to pivot the drive roller module 106 about a central vertical axis 134 to adjust the angle of the roller 125 relative to the direction of belt travel 114 (FIG. 1). As indicated in FIGS. 2A and 2B, each control arm 131, 132 comprises an opening 133 that enables pivotal connection to an appropriate member that is used to adjust the angular orientation of the drive roller module 106.

As best shown in FIG. 2B, the frame 126 further includes a base 135 and a pivot mechanism 137 that supports the base. In the embodiment of FIG. 2B, the pivot mechanism 137 comprises upper and lower portions 139 and 141 that can rotate in opposite directions relative to each other and thereby enable pivoting of the drive roller module 106. Suitable friction reducing elements, such as bearings, can be provided between the portions 139 and 141 to facilitate such pivoting.

Figure 3:
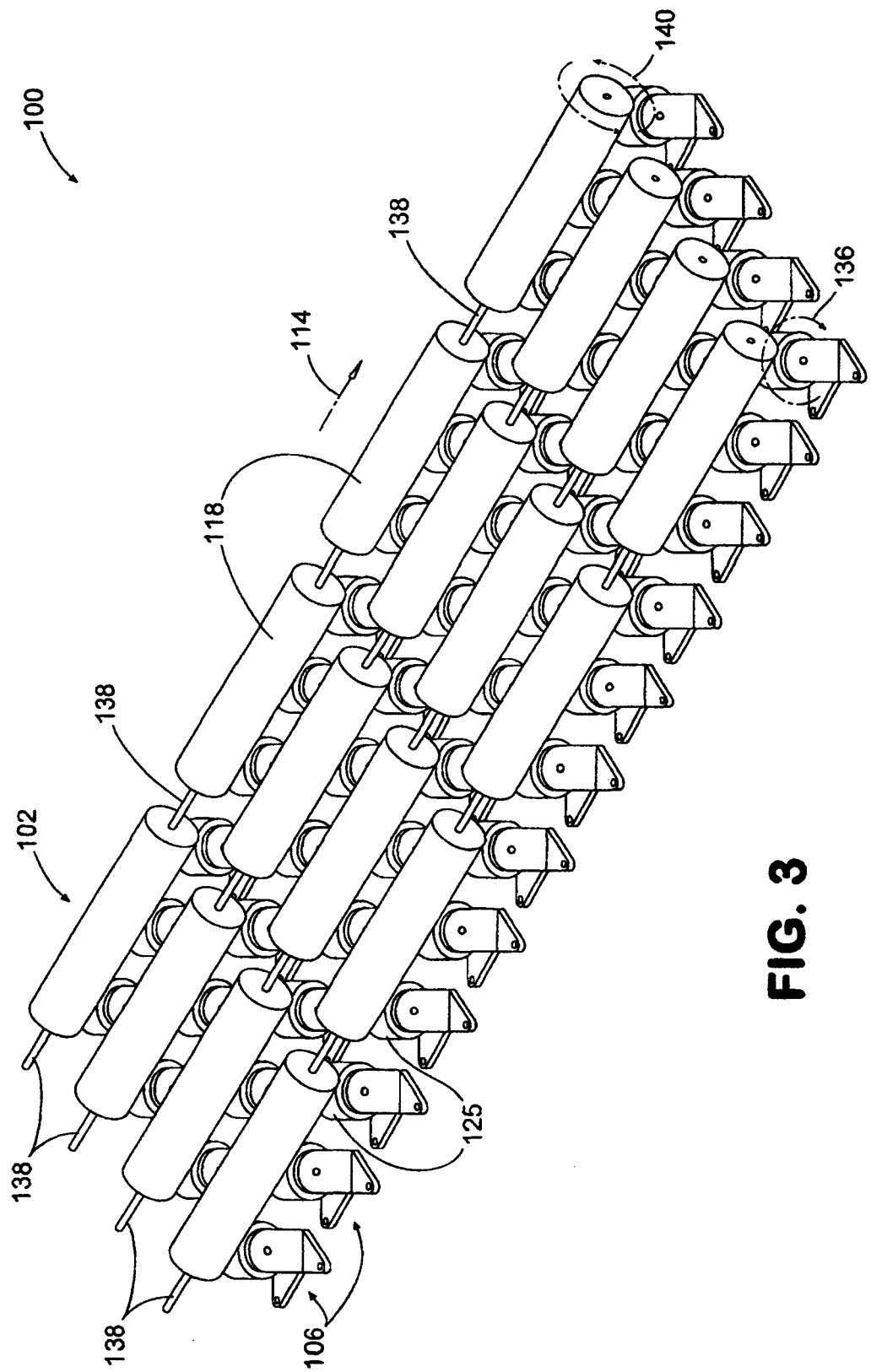
FIG. 3 is top perspective view of a further portion of the conveyor system of FIG. 1.

FIG. 3 illustrates a further portion of the conveyor system 100. More particularly, FIG. 3 illustrates interaction between the drive rollers 125 and the conveyor belt rollers 118. Notably, the conveyor belt frame 108 is not shown in the figure for purposes of clarity in describing other components of the conveyor system 100.

As indicated in FIG. 3, the drive rollers 125 are positioned so as to contact the conveyor belt rollers 118 such that movement of the conveyor belt 120 in the direction of belt travel 114 causes rotation of both the drive rollers and the conveyor belt rollers due to the frictional forces between them. In the orientation shown in FIG. 3, the drive rollers 125 rotate in a downstream direction indicated by arrow 136. As a consequence of that rotation, the conveyor belt rollers 118 are caused to rotate, or are "driven," about their shafts 138 (i.e., axes of rotation) in the direction indicated by arrow 140. Accordingly, in FIG. 3, the conveyor belt rollers 118 rotate counterclockwise (when viewing the conveyor belt 102 from its end looking upstream) and would therefore divert objects supported by the conveyor belt rollers to the left in the orientation of the figure. As is further shown in FIG. 3, each conveyor belt roller 118 is driven in the above manner by multiple drive rollers 125.

Figure 4:
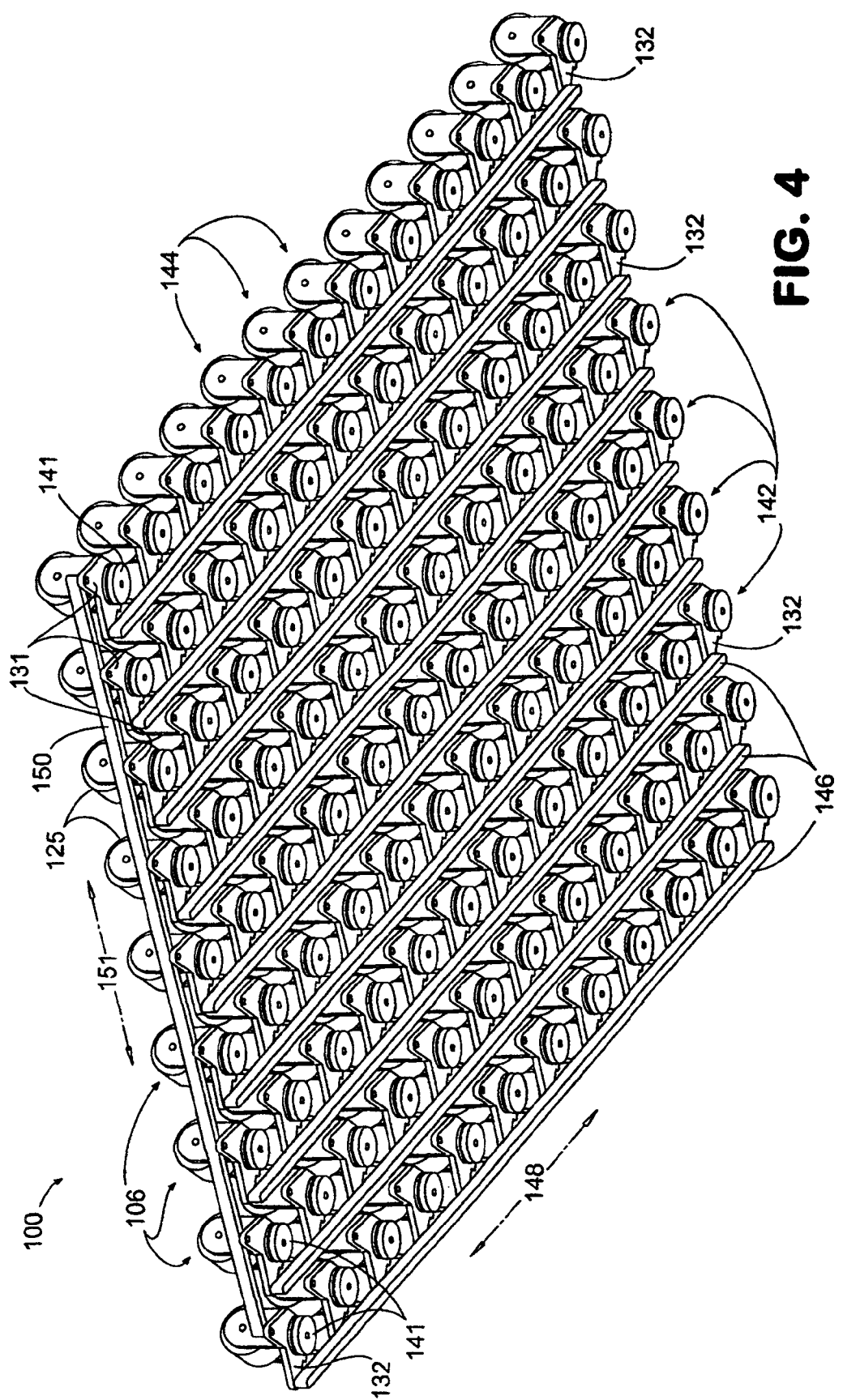
FIG. 4 is a bottom perspective view of a plurality of drive roller modules used in the conveyor system of FIG. 1.

As described above, the drive roller modules 106, and therefore the drive rollers 125, can be pivoted about their central vertical axes 134 (FIGS. 2A and 2B) to adjust their angulation relative to the direction of belt travel. The drive rollers 125 can be independently actuated or actuated in synchrony in groups. FIG. 4 illustrates a mechanism for enabling the latter actuation scheme (conveyor belt 102 not shown). As indicated in FIG. 4, a plurality of rows 142 and columns 144 of drive roller modules 106 are provided having the general configuration described in relation to FIG. 2. As is further indicated in FIG. 4, the rows 142 of drive roller modules 106 are linked together with linking members 146 that control the angular orientation of the rollers 125. More particularly, control arms 132 of the drive roller modules 106 are pivotally connected to a linking member 146, which can take the form of a rod or shaft. By way of example, that connection is made with pins (not shown) that extend through the openings 133 (FIGS. 2A and 2B) provided in the control arms 132 of the drive roller modules 106 and into aligned openings (not shown) of the linking member 146. When the position of each drive roller module 106 is fixed relative to its central vertical axis 134, for example due to fixation of the lower portion 141 of the pivot mechanism 137 (FIGS. 2A and 2B), transverse displacement of the linking members 146 in the directions indicated by arrow 148 causes the rollers 125 to pivot about the central vertical axes, thereby adjusting their angular orientation.

The linking members 146 can be displaced by any appropriate means. In embodiments in which multiple linking members 146 are to be simultaneously displaced, and therefore multiple rows of rollers 125 are to be simultaneously pivoted, the linking members can be connected to a single actuation member 150 that is positioned adjacent either side of the conveyor system 100 and pivotally connected to control arms 131 of an adjacent column 144 of drive roller modules 106. In such a case, longitudinal displacement of the actuation member 150 in the directions indicated by arrow 151 will cause pivoting of the adjacent column 144 of drive roller modules 106, which therefore causes the linking members 146 to laterally translate, which, in turn, causes the remaining drive roller modules to pivot.

Figure 5A:
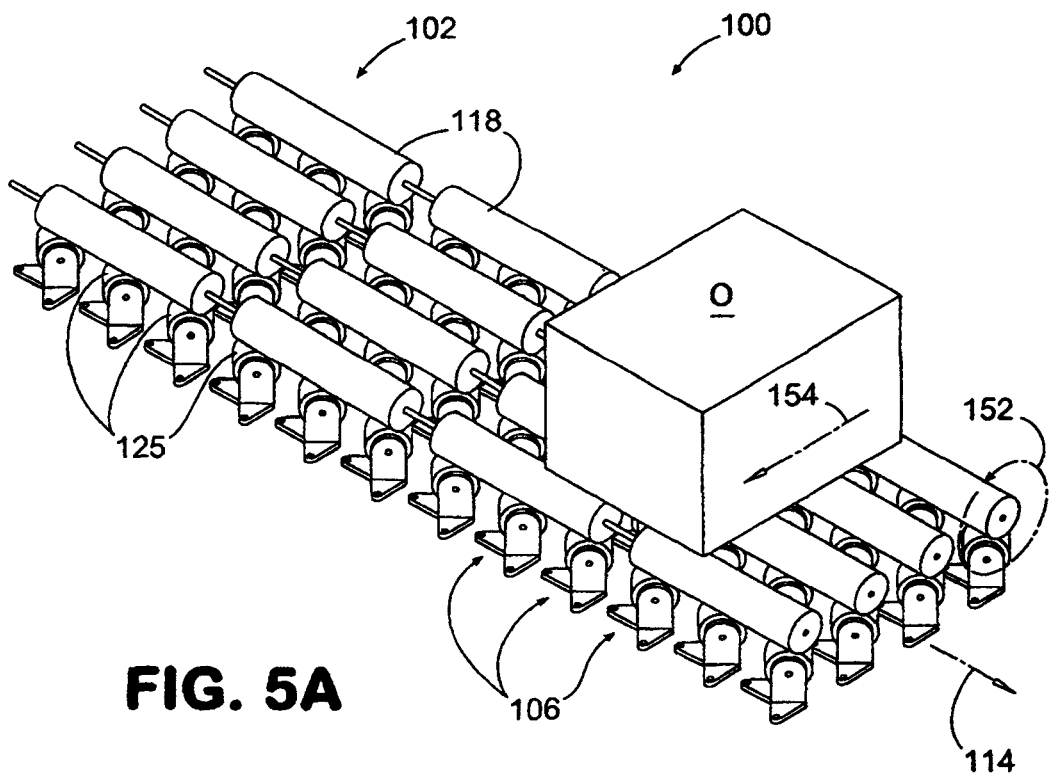
FIG. 5A is a view of the conveyor system portion shown in FIG. 3, illustrating diverting action in a first direction.
Figure 5B:
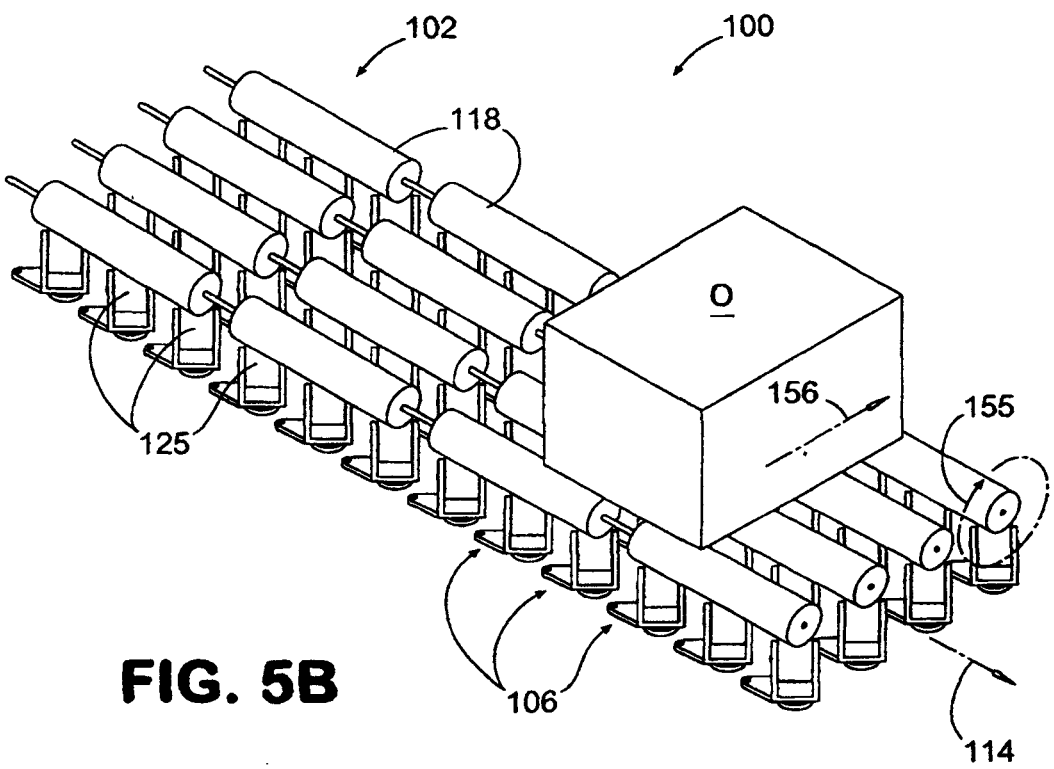
FIG. 5B is a view of the conveyor system portion shown in FIG. 3, illustrating diverting action in a second direction.

FIGS. 5A and 5B illustrate the effect of angular adjustment of the drive roller modules 106. Notably, the conveyor belt frame 108 is not shown in FIGS. 5A and 5B for purposes of clarity in describing other components of the conveyor system 100. Beginning with FIG. 5A, the drive roller modules 106 have been pivoted in a counterclockwise direction (when the conveyor belt 102 is viewed from above) to cause counterclockwise rotation (when the conveyor belt is viewed from its end looking upstream) of the conveyor belt rollers 118, as indicated by arrow 152. Such rotation of the conveyor belt rollers 118 causes diverting action in a leftward direction in the orientation of FIG. 5A, so as to displace an object O in the direction of arrow 154. In FIG. 5B, however, the drive roller modules 106 have been pivoted in a clockwise direction (when the conveyor belt 102 is viewed from above) to cause the conveyor belt rollers 118 to rotate in a clockwise direction (when the conveyor belt 102 is viewed from its end looking upstream) indicated by arrow 155 to cause diverting action in a rightward direction and displace the object O in the direction of arrow 156.

Figure 6A:
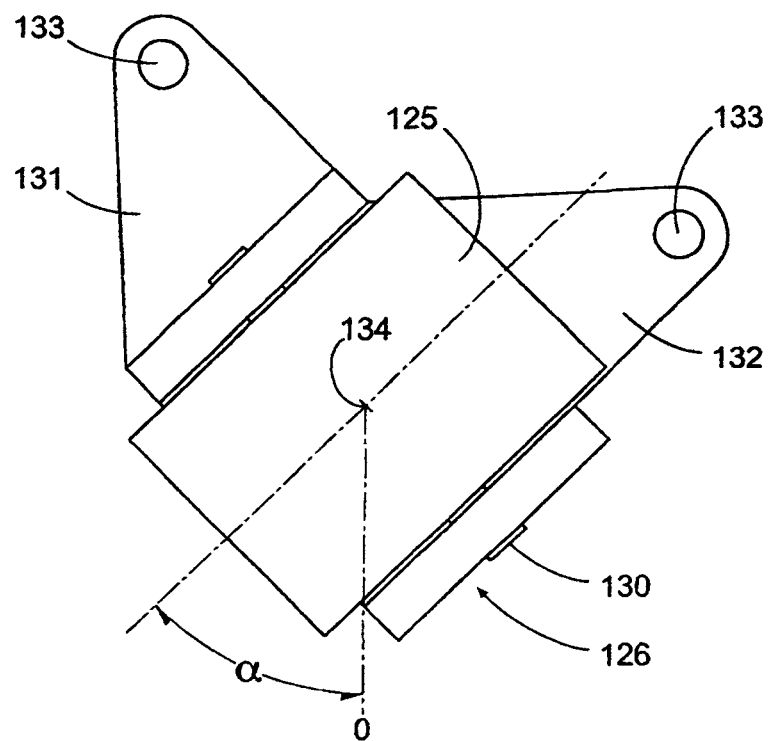
FIG. 6A is a top view of a drive roller module, illustrating pivoting of the module in a first angular direction.
Figure 6B:
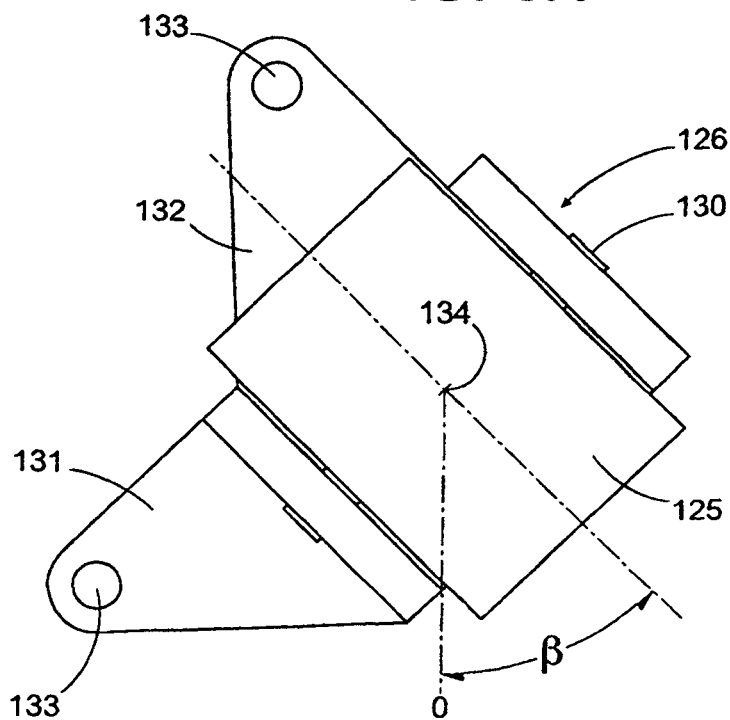
FIG. 6B is a top view of a drive roller module, illustrating pivoting of the module in a second angular direction.

FIGS. 6A and 6B illustrate the variability of diverting angles possible with the drive roller modules 106. As indicated in FIG. 6A, each drive roller module 106 can potentially be taken from a 0° orientation, in which the axis of rotation of the roller 125 is perpendicular to the direction of conveyor belt travel, to some negative angle represented by $\alpha$. As indicated in FIG. 6B, the drive roller module 106 can also be taken from the 0° orientation to some positive angle represented by $\beta$. In some embodiments, both $\alpha$ and $\beta$ can comprise any angle from 0 to 90°, thereby equating to 180° of angular variability. Although such a broad range of angular variability is possible, conveyor belt speed and limitations of the materials used for the drive rollers 125 and conveyor belt rollers 118 may limit the range of angular orientations in which roller slip can be avoided. However, angular ranges of at least approximately −70° to +70° are achievable at conveyor belt speeds of at least 100 ft/min using known high-friction surfaces. Notably, the angular displacement of the drive rollers 125 directly corresponds to the resultant diverting angle. For example, when the drive rollers 125 are oriented 35° clockwise of the 0° orientation as shown in FIG. 6A, a 35° diverting angle to the right direction results.

When the drive rollers 125 are positioned in the 0° orientation shown in FIG. 7, in which the axes of rotation of the drive rollers are perpendicular to the direction belt travel and the direction of angular rotation of the drive rollers is in line with the direction of belt travel, the conveyor belt rollers 118 are substantially prevented from rotating and are therefore "braked." Accordingly, undesired lateral movement of objects on the conveyor belt can be prevented, if desired, by controlling the drive roller modules 106, to be placed in the 0° orientation. It is further noted that when the angular orientation of the drive rollers 125 is adjusted from the 0° orientation as an initial position, the conveyor belt rollers 118 can be gradually accelerated in one direction or the other, thereby decreasing or all together preventing the roller slip that can occur when a friction plate or angled rollers suddenly engage the conveyor belt rollers. Gradual acceleration of the conveyor belt rollers 125 also enables relatively unstable objects to be diverted without tipping over. For instance, if an object to be diverted is relatively tall and has a relatively small base, the object can be gradually accelerated to one side or the other of the conveyor belt 102 by slowly increasing the angulation of the drive rollers from the 0° orientation.

Figure 8A:
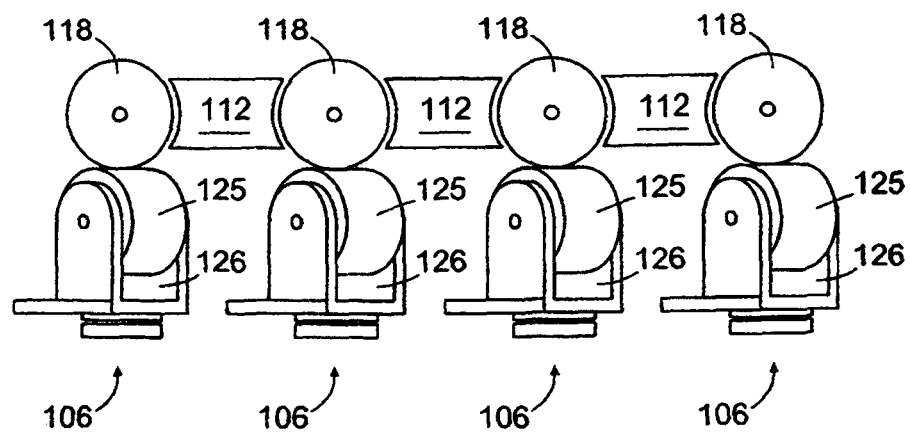
FIG. 8A is an end of a portion of the conveyor system of FIG. 1, illustrating engagement of angularly adjustable drive rollers and conveyor belt drive rollers.
Figure 8B:
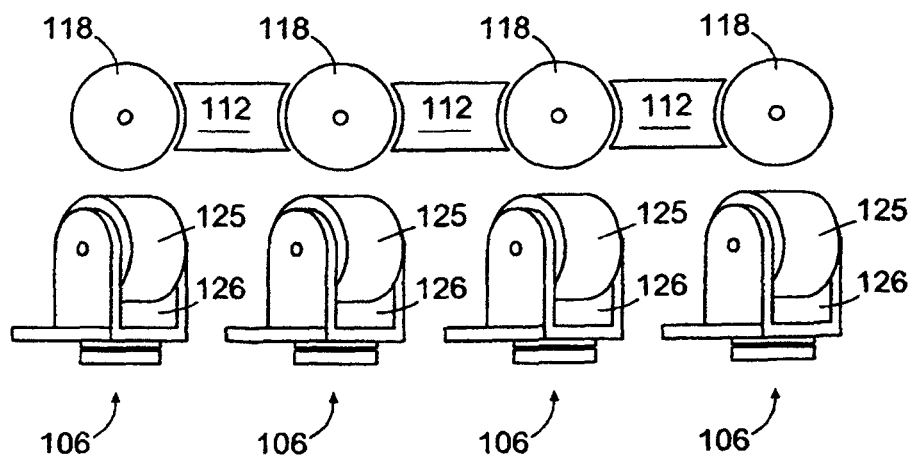
FIG. 8B is an end of a portion of the conveyor system of FIG. 1, illustrating disengagement of angularly adjustable drive rollers and conveyor belt drive rollers.

In addition to being angularly adjustable, the drive roller modules 106 can, optionally, be vertically actuated to engage or disengage the drive rollers 125 with conveyor belt rollers 118. Such functionality is depicted in FIGS. 8A and 8B. In particular, FIG. 8A illustrates the drive rollers 125 in engagement with the conveyor belt rollers 118, while FIG. 8B illustrates the drive rollers disengaged from the conveyor belt rollers. Such selective engagement and disengagement can be provided with an appropriate mechanism (not shown in FIG.

8A or 8B) that lifts the drive rollers 125 into contact with the conveyor belt rollers 118 and lowers the drive rollers out of contact with the conveyor belt rollers.

From the above it can be appreciated that several advantages can be achieved through use of conveyor systems that comprise angularly adjustable rollers that drive rollers contained within a conveyor belt. For example, objects can be diverted to either side of the conveyor system at various angles. In addition, the conveyor belt rollers can be braked to control object drift across the conveyor belt. Furthermore, the conveyor belt rollers can be accelerated to some desired angular velocity with virtually no slip.

It is noted that other advantages can also be realized with such conveyor systems. For example, discrete groups of drive rollers can be operated in different zones of the conveyor system not only along the direction of travel of the conveyor belt but also along the width of the conveyor belt through the provision of discrete control mechanisms (e.g., linking members). In such cases, the positions of objects on the conveyor belt can be controlled with great precision by individually controlling the drive rollers of the different zones. In fact, when a "smart" detection and control system is provided, such as an imaging-based system, individual objects can be identified and precisely moved along and/or across the belt, for example to enable desired ordering and/or alignment of the objects on further conveyor belts on which the objects are to be placed.

Figure 9:
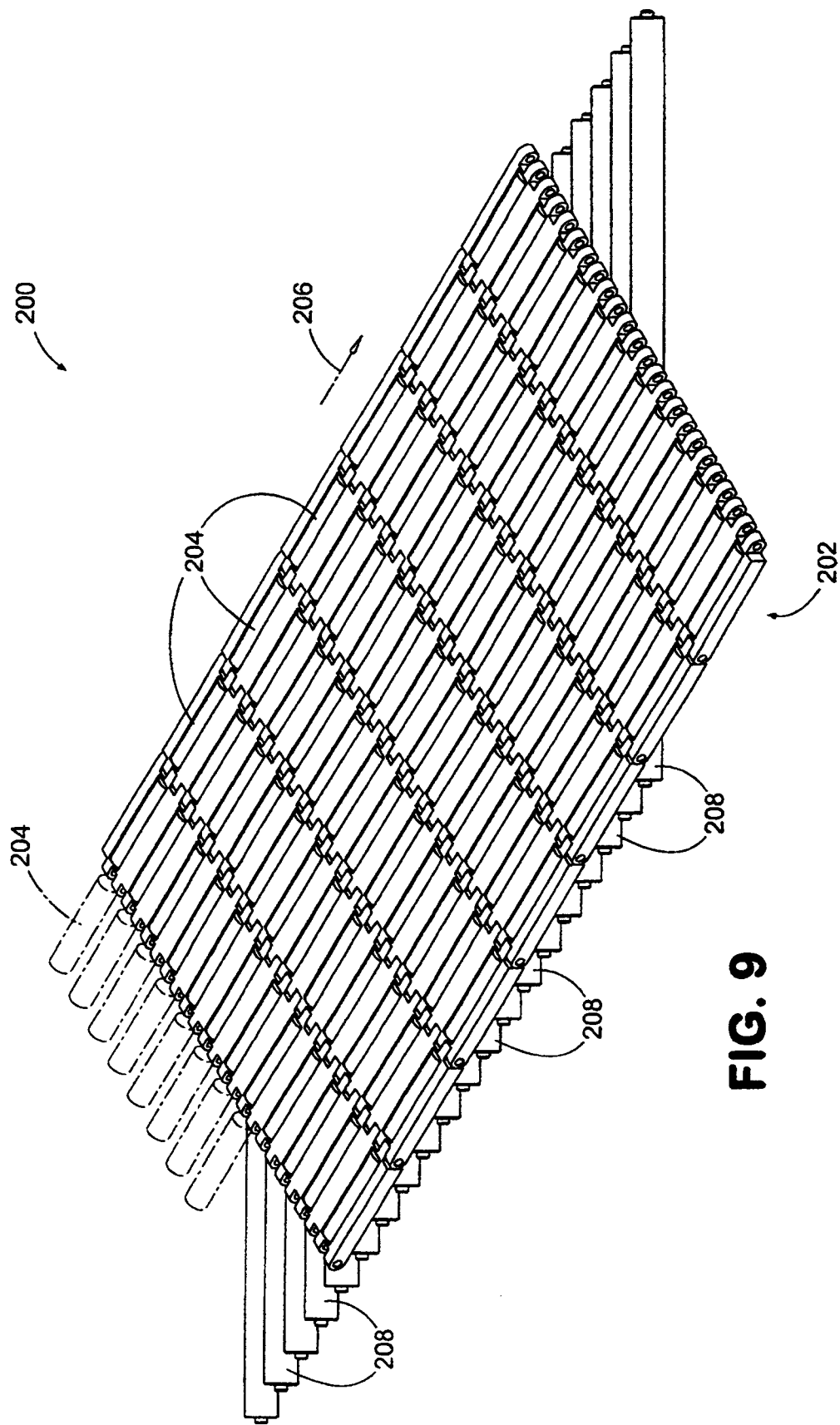
FIG. 9 is a top perspective view of a second embodiment of a portion of a conveyor system.

Turning to FIG. 9, illustrated is a second embodiment of a portion of a conveyor system 200. As indicated in that figure, the conveyor system 200 is similar in several ways to the conveyor system 100 shown in FIG. 1. Therefore, the conveyor system 200 generally comprises a conveyor belt 202 that includes a plurality of longitudinally oriented free-spinning conveyor belt rollers 204. The conveyor belt 202 travels in a direction of belt travel identified by arrow 206. In addition, the system 200 comprises a plurality of free-spinning angularly adjustable drive rollers 208. In the system 200, however, the drive rollers 208 are elongated, or "longitudinal," rollers instead of caster rollers. In the embodiment shown in FIG. 9, the drive rollers 206 are longer than the conveyor belt 202 is wide.

FIGS. 10A-10C illustrate angular adjustment of the drive rollers 208 relative to the conveyor belt 202. In particular, assuming a conveyor belt direction of travel indicated by arrow 206, FIG. 10A illustrates an angulation of the drive rollers 208 that results in the diverting of objects to the left, FIG. 10B illustrates the "braking" orientation of the drive rollers, and FIG. 10C illustrates an angulation of the driver rollers that results in the diverting of objects to the right.

Figure 11B:
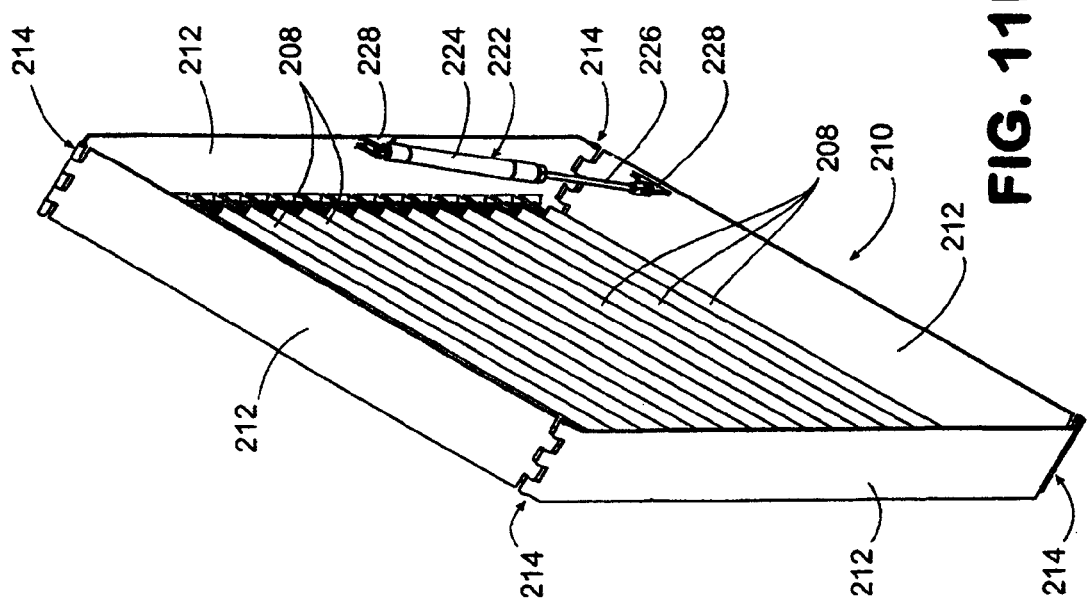
FIGS. 11A and 11B are perspective views of an embodiment of a mechanism that can be used to adjust the angulation of the drive rollers of the conveyor system of FIG. 9.
Figure 11A:
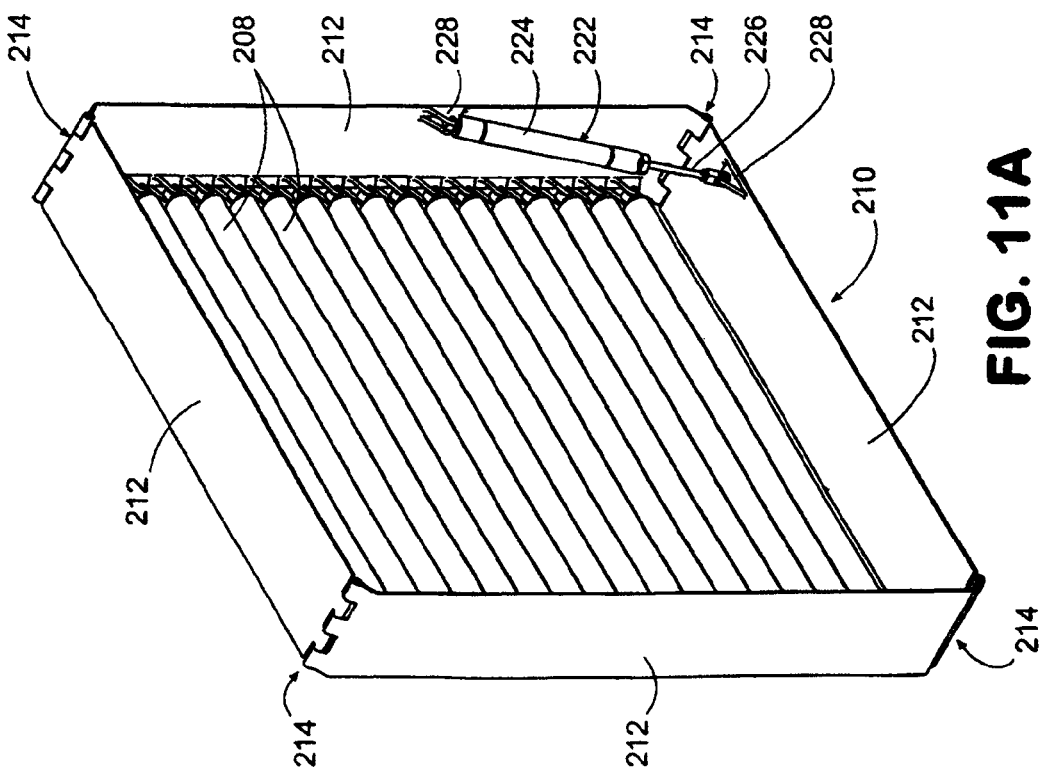

As with the conveyor system 100, the drive rollers 208 can be angularly adjusted using a variety of adjustment mechanisms. FIGS. 11A and 11B illustrate one such mechanism (conveyor belt not shown for purposes of clarity). As shown in those figures, the drive rollers 208 can be pivotally supported by a rectangular frame 210 comprising multiple frame members 212 that are pivotally connected to each other at pivot joints 214 located at corners of the frame. By way of example, each pivot joint 214 is formed by leaves of the frame members 212 that interleave with each other and are secured together with a pin or shaft (not shown). With such a configuration, orientation of the frame 210 can be changed from the orthogonal orientation shown in FIG. 11A, in which the frame members 212 form approximately 90° angles at each of the corners of the frame, to another orientation at which two acute angles and two obtuse angles are formed at the frame corners, as shown in FIG. 11B, thereby placing the frame into a parallelogram shape. In the orthogonal orientation of FIG. 11A, the drive rollers 208 are aligned so as to be perpendicular to the direction of belt, as indicated in FIG. 10B. Therefore, the orthogonal orientation of FIG. 11A is the braking orientation. At other orientations, however, such as that indicated in FIG. 11B, the drive rollers 208 are oriented such that they are positioned at an angle relative to the direction of belt travel, thereby providing the diverting function.

Figure 12:
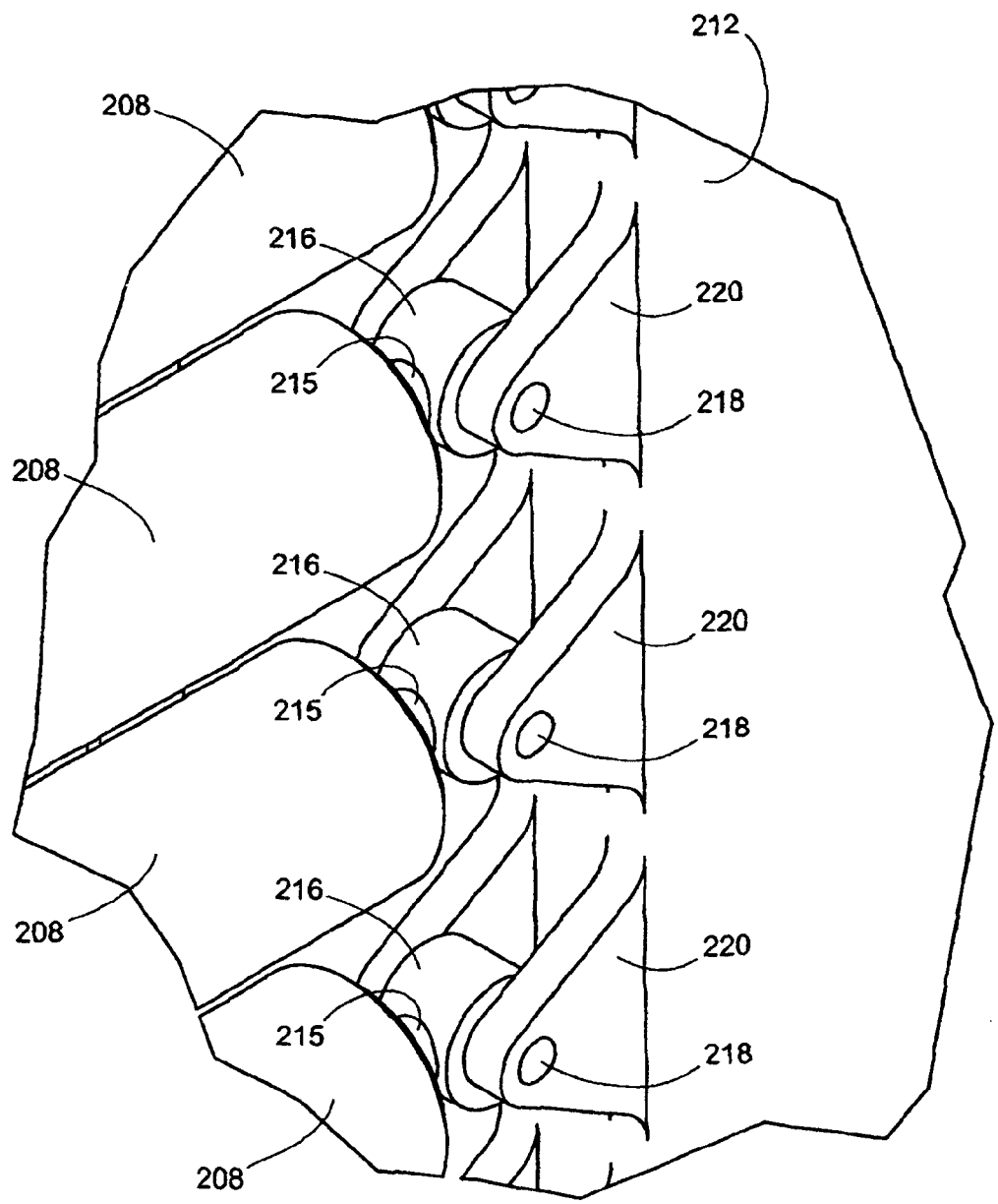
FIG. 12 is a detail view of an embodiment of joints that support ends of drive rollers in the conveyor system of FIG. 9.

Each drive roller 208 is supported at both ends by a joint that permits the change in orientation as well as free rotation. With reference to the detail view of FIG. 12, each drive roller 208 can, for example, be supported by a shaft 215 having "eye" connectors 216 configured to receive a pin 218 that extends through a support bracket 220 that is mounted to a frame member 212.

Returning to FIGS. 11A and 11B, the frame 210 can be manipulated in the manner described above by, for example, using an actuator 222. In the embodiment shown in FIGS. 11A and 11B, the actuator 222 comprises a piston member having a piston body 224 from which a piston arm 226 can be extended, for instance under the influence of hydraulic or pneumatic pressure. Both the piston body 224 and the piston arm 226 are pivotally connected to adjacent frame members 212 with mounting brackets 228. With such an arrangement, retraction of the piston arm 226 into the piston body 224 results in angular adjustment of the drive rollers 208 in a first angular direction, while extension of the piston arm from the piston body results in angular adjustment of the drive rollers in a second, opposite angular direction. Such manipulation is evident from FIGS. 11A and 11B. In particular, FIG. 11A illustrates a first extent of extension of the piston arm 226 from the piston body 224 and a first orientation of the drive rollers 208, while FIG. 11B illustrates a second (greater) extent of extension of the piston arm from the piston body and a second orientation of the drive rollers. Through appropriate extension and retraction of the piston arm 226, the orientation of the drive rollers 208 can be precisely controlled and diverting of objects can be achieved to either side of the conveyor belt 202 at various diverting angles as depicted in FIGS. 10A-10C.

Figure 13:
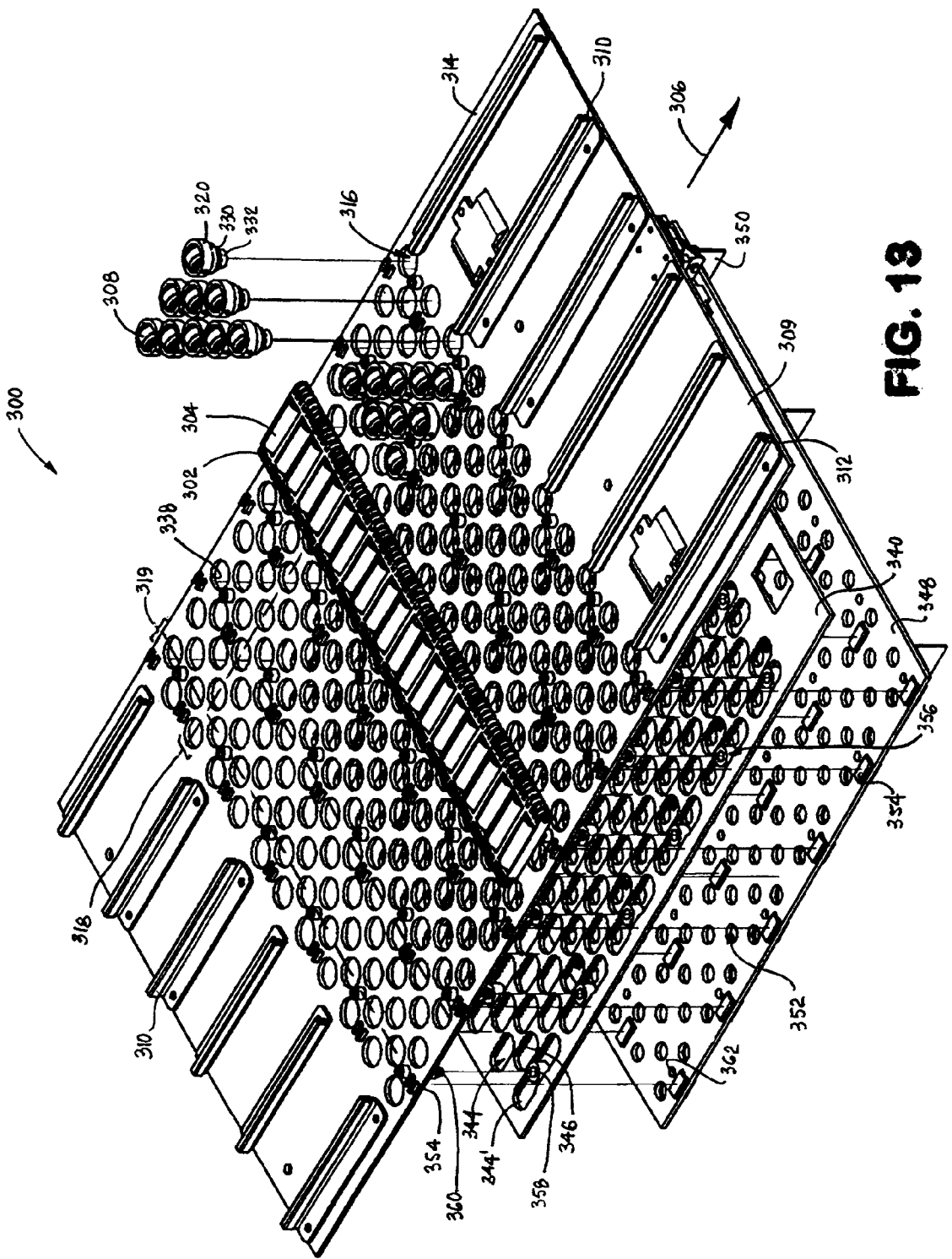
FIG. 13 is an exploded top isometric view of a third embodiment of a portion of a conveyor system with a rack-and-pinion roller drive mechanism.

An exploded view of a portion of another version of a diverting conveyor system 300 having a different roller drive mechanism is shown in FIG. 13. A conveyor belt 302 has a plurality of cylindrical rollers 304 mounted on axles (not shown) aligned longitudinally in the direction of belt travel 306. The belt is constructed of a series of rows 307 of one or more belt modules, only one row of which is shown in FIG. 13, connected side to side and end to end at hinge joints into an endless belt loop advancing along a portion of a conveyor carryway 309 in the direction of belt travel. The belt rollers are supported atop an array of drive rollers 308 along a portion of the carryway. Narrow rails 310 upstream and downstream of the drive-roller array support the belt along the remainder of the carryway. The narrow rails, topped with UHMW wear-strips 312, support the underside of the belt between adjacent rollers.

The rails are mounted on a carryway pan 314, which is itself mounted in a conveyor frame (not shown). The pan is perforated with a plurality of circular openings 316 arranged in longitudinal columns 318 and lateral rows 319. The columns of openings are laterally aligned with the lateral positions of the belt rollers. Each opening rotatably receives a cartridge 320 supporting a freely rotatable drive roller 308, which engages the belt rollers in the corresponding column as the belt advances in the direction of belt travel. The rolling contact between the belt rollers and the drive rollers causes them both to roll on each other and rotate as long as their axis are oblique to each other.

Figure 14:
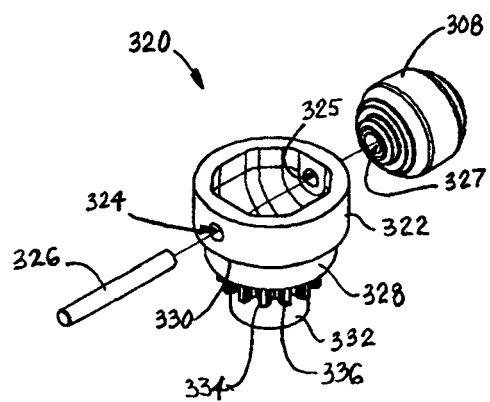
FIG. 14 is a top exploded isometric view of a drive roller cartridge of the conveyor system of FIG. 13.

As shown in FIG. 14, the drive roller cartridge 320 includes a retainer ring 322 with diametrically opposite holes 324, 325 supporting the ends of an axle 326 received in a bore 327 in the drive roller 308. One of the holes 324 can be a through hole through which the axle can be inserted into the cartridge and the drive roller, and the other hole 325 can have a blind end forming an end stop for the axle. In this way, the drive roller is retained in the cartridge along a fixed axis with a salient portion of the roller protruding beyond the top of the retainer ring. Extending downward from the retainer ring encircling the drive roller is an upper journal stem 328 having a cylindrical outer periphery indented inward from the ring, which forms a shoulder 330 between the peripheries of the ring and the stem. A lower journal stem 332 distal from the retainer ring has a smaller diameter than the upper journal stem. The periphery of the lower journal stem is indented inward of the periphery of the upper journal stem. A cartridge gear 334 is disposed between the upper stem and the lower stem. The cartridge gear is preferably a spur gear with peripheral teeth 336 whose tips do not extend past the periphery of the upper journal stem.

The cartridges 320 are received in the openings 316 in the carryway pan as shown in FIG. 13. The walls of the openings form bearing surfaces 338 against which the upper journal stems can rotate. Because the diameter of the retainer rings exceeds the diameter of the openings, the ring's shoulder 330 rests atop the carryway pan with the smaller-diameter stems and gear portions suspended below.

A gear plate 340 is movably positioned below the carryway pan. Actuator gears in the form of rack gears 342 are disposed on the gear plate. Each rack gear is positioned to engage the teeth of one of the cartridge gears to form a rack-and-pinion system that can rotate the cartridges in unison as the gear plate is translated. The gear plate has openings 344 elongated in the direction of belt travel. The elongated openings are bounded on one side by a linear array of teeth 346 forming a rack gear. Each elongated opening is positioned below one of the openings 316 in the carryway pan. The lower journal stem extends through the elongated openings in the gear plate, which is sandwiched between two other plates: the carryway pan 314 (top plate) and a bottom plate 348. The bottom plate, which is stationarily affixed to a portion of the conveyor frame 350, has a plurality of openings 352 vertically aligned with, but having a smaller diameter than, the openings in the carryway pan. The openings 352 are sized to rotatably receive the lower journal stems 332 of the cartridges. This helps align the upper and lower support plates to facilitate assembly of the roller drive mechanism and also confines the rotatable cartridges in rotation on fixed vertical axes.

Confronting spacer pads 354 on the top of the bottom plate 348 and on the bottom of the top plate 314 meet to maintain the proper spacing between the two plates to accommodate the movable gear plate 340. Some of the elongated openings 344' in the gear plate are joined by intermediate slots 356. Rollers 358 in the slot portions are rotationally mounted on pins 360 extending downward from the bottom of the top plate. The distal ends of the pins are received in sockets 362 in the bottom plate. The rollers 358 bear on the sides of the slots as the gear plate is translated relative to the top and bottom plates.

Figure 15:
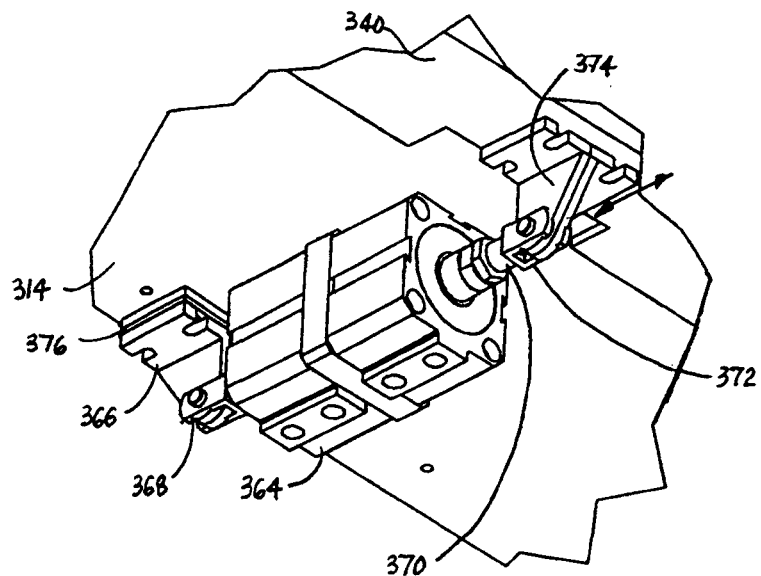
FIG. 15 is a bottom isometric view of a linear actuator in the roller drive mechanism of FIG. 13.

The gear plate is translated by a linear actuator 364, such as an air cylinder, as shown in FIG. 15. One end of the actuator is attached to a mounting bracket 366 suspended from the bottom of the top plate, or carryway pan 314, by a clevis and tie rod 368. The extension of an extension rod 370 from the other end of the actuator is selectable. The distal end of the extension rod is connected by a clevis and tie rod 372 to a pivot bracket 374 suspended from the bottom of the gear plate 340. The extension rod translates the gear plate, the rod's extension determining the position of the gear plate and the orientation of the drive rollers. Shims 376 under the mounting bracket 366 are used to account for the offset between the bottom of the carryway and the top of the gear plate.

Figure 16B:
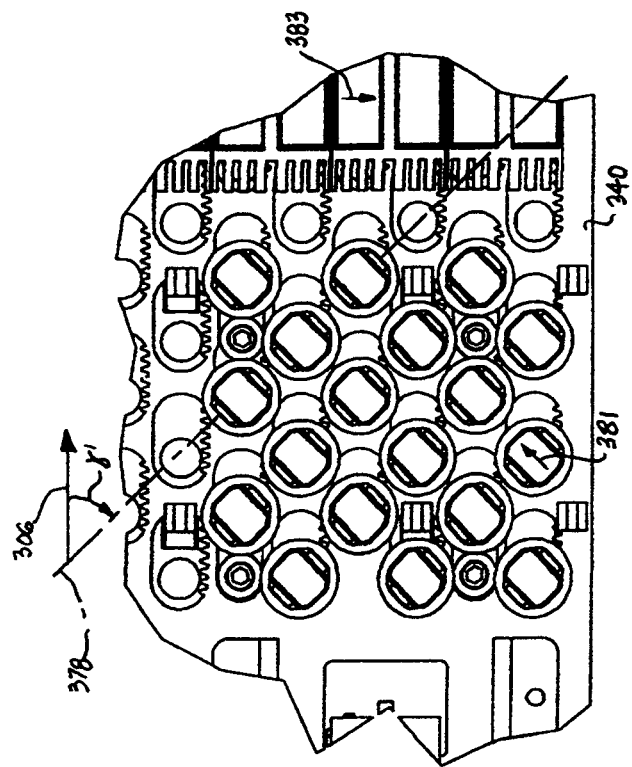
FIGS. 16A and 16B are top plan views of the drive rollers of the conveyor system of FIG. 13 shown in opposite extreme positions.
Figure 16A:
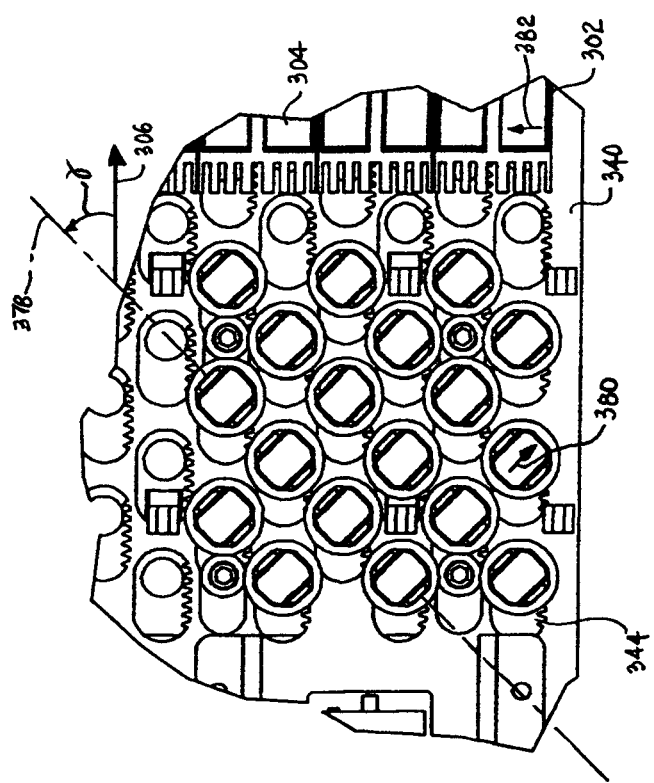

The operation of the diverting conveyor system is illustrated in FIGS. 16A and 16B. In FIG. 16A, the gear plate 340 is shown translated to one extreme position in which the drive roller cartridges 320 are positioned at the far right of the elongated slots 344. With the cartridges rotated to this position, the axes of rotation 378 of the drive rollers 308 form a counter clockwise acute angle γ measured from the direction of belt travel 306. As the conveyor belt 302 advances in the direction of belt travel, the drive rollers in this orientation rotate in the direction of arrow 380 and the engaged belt rollers in the direction of arrow 382 to direct conveyed objects towards the top of FIG. 16A. When the gear plate is translated over its range to the opposite extreme with the cartridges positioned at the far left of the elongated slots in FIG. 16B, the axes of rotation 378 of the drive rollers form a clockwise acute angle γ' measured from the direction of belt travel. In this orientation, the drive rollers rotate in the direction of arrow 381, and the belt rollers rotate in the direction of arrow 383 to push conveyed objects toward the bottom of FIG. 16B—opposite to the diverting direction of FIG. 16A. The gear plate can also be translated so that the axes of rotation of the drive rollers are perpendicular to the axes of rotation of the belt rollers to effectively brake the belt rollers.

Figure 17:
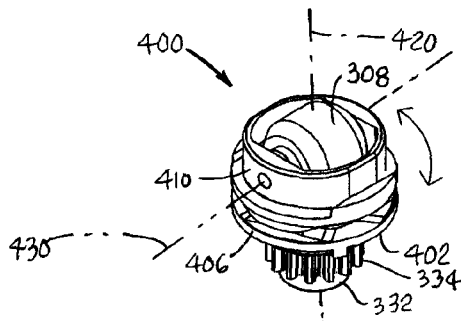
FIG. 17 is an isometric view of another version of a drive roller cartridge usable in the conveyor system of FIG. 13 including a twist-up feature.
Figure 18:
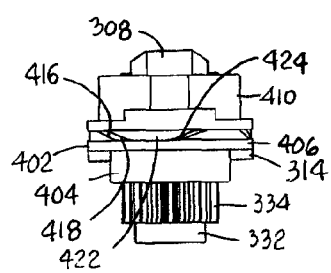
FIGS. 18 and 19 are elevation views of the roller cartridge in deactuated and actuated states.
Figure 19:
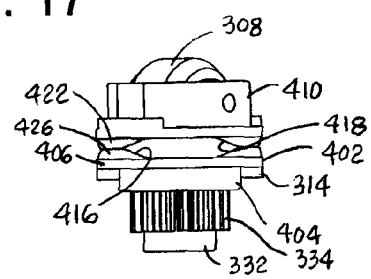

Another version of a drive roller cartridge is shown in FIGS. 17-19. The cartridge 400 has a non-pivoting base 402 affixed to a carryway pan 314 as in FIG. 13. A hollow tubular portion 404 of the base 402 extends down through the mounting opening 316 of the carryway pan 314 from a larger diameter ring portion 406. The drive roller 308 is rotatably mounted in a retainer ring 410. A lower cartridge gear 334 and a stem 332 extend downward from the retainer ring 410 and through the ring portion 406 and the tubular portion 404 of the base 402. The stem is pivotably positioned in an opening 352 in a bottom plate 348 as in FIG. 13. The cartridge gear 334 is engaged with one of the actuator gears 342 in the gear plate 340. An upwardly facing cam surface 416 on the top face of the base's ring portion 402 coacts with a downwardly facing cam surface 418 on the bottom face of the drive roller retainer ring 410. As depicted in FIGS. 17-19, both cam surfaces are lobed with ramp sections 419 to form a cam that raises and lowers the roller's retainer ring 410 as it is pivoted about its vertical axis 420. FIG. 18 shows the retainer ring 410 in a lowered position with downwardly facing lobes 422 of the retainer ring's cam surface 418 sitting in valleys 424 formed by the base's cam surface 416. FIG. 19 shows the retainer ring in a raised position with the lobes 422 sitting atop the lobes 426 of the base 402. The lobes and valleys of both cam surfaces are flattened to stabilize or lock the cartridges into the raised and lowered positions.

Figure 20A:
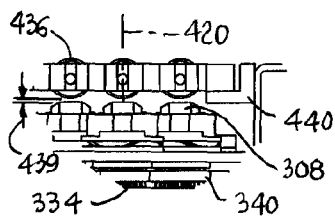
FIGS. 20A and 21A are enlarged views of portions of FIGS. 20 and 21.
Figure 21A:
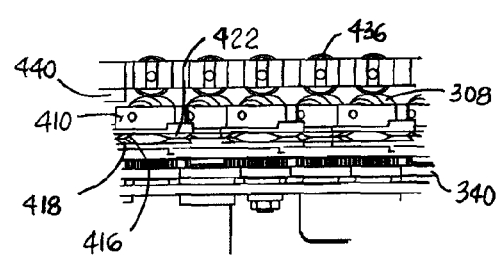
Figure 20:
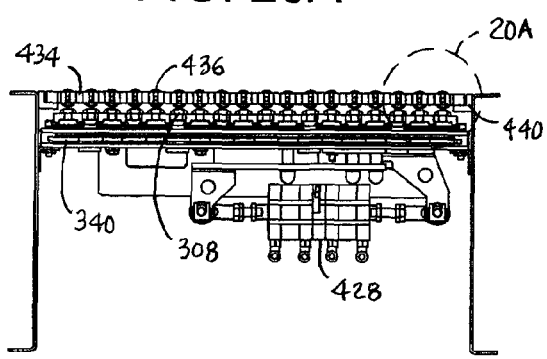
FIGS. 20 and 21 are front elevation views of a conveyor system using the drive roller cartridges of FIG. 17 in deactuated and actuated states.
Figure 21:
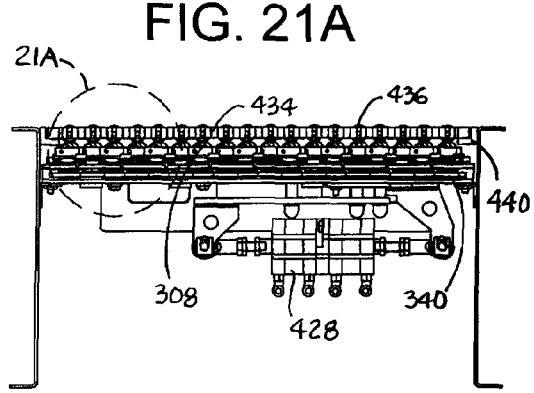

As shown in FIGS. 20 and 21, the gear plate 340 of the roller drive mechanism is translated by a linear actuator 428, such as a dual cylinder, mounted to the conveyor frame. The actuator gears in the rack-gear plate 340 engage the pinion gear 334 on the cartridge 400 and cause the cartridge to pivot about the vertical pivot axis 420. As the retainer ring 410 pivots inside the fixed base 402, its cam surface 416, operating as a cam follower, rides on the base's facing cam surface 418—up the ramp sections 419 from valley 424 to lobe 426 and down from lobe to valley. The lobe or lobes 422 on the retainer ring are arranged relative to the axis of rotation 430 of the drive roller 308 so that the elevation of the roller is a function of the pivot angle (a, as in FIG. 6A), i.e., the angle between the direction of rotation of the drive roller and the direction of belt travel. The number of lobes and valleys on the base's cam surface and their spacings determine the number and range of stable pivot angles of the drive rollers. In the raised position (lobe-to-lobe contact as shown in FIG. 19), the pivot angle is an acute angle oblique to the direction of belt travel (out of the page for FIGS. 18-21). The raised drive roller 308 engages the belt rollers 436 on the advancing conveyor belt 434 to drive the belt rollers toward one side of the belt and divert conveyed articles toward that side as shown in FIG. 21A. The belt rollers can be actuated to rotate in the opposite direction to divert articles toward the other side of the belt by pivoting the cartridge so that the drive roller ring's cam lobe 422 is atop the other lobe of the base's cam surface 416. When the drive roller is lowered (lobe-to-valley contact as shown in FIG. 18), the pivot angle is 0°. In this deactuated state, the belt rollers are out of contact with the drive rollers across a vertical gap 439, as shown in FIG. 20A. Thus, the drive-roller cartridges can be twisted up and down by the gears into and out of contact with the conveyor belt rollers. The belt 438 is supported by support rails 440 at the side edges of the belt. When the rollers are actuated, the belt 438 is supported by the drive rollers 308 and the support rails 440. Because there is no contact between the belt rollers and the drive rollers in the deactuated state, noise and roller wear are reduced.

Figure 22:
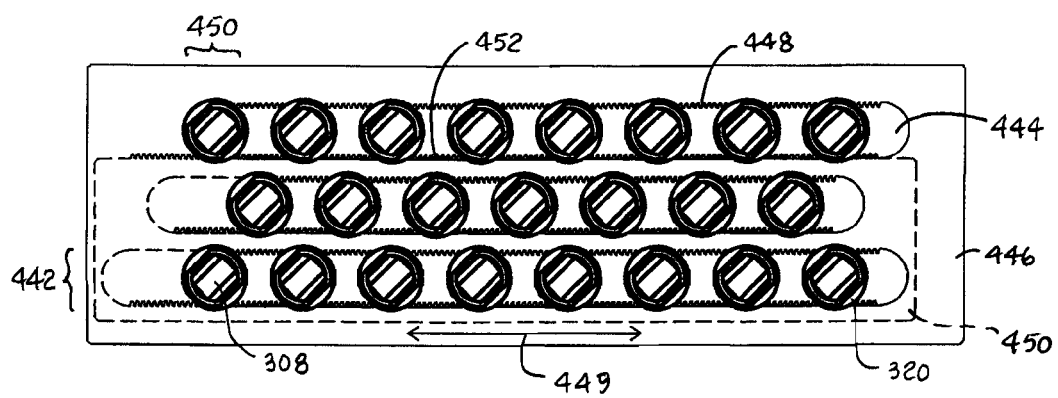
FIG. 22 is a top plan view of another version of laterally shiftable drive rollers usable in a conveyor system as in FIG. 13.
Figure 23:
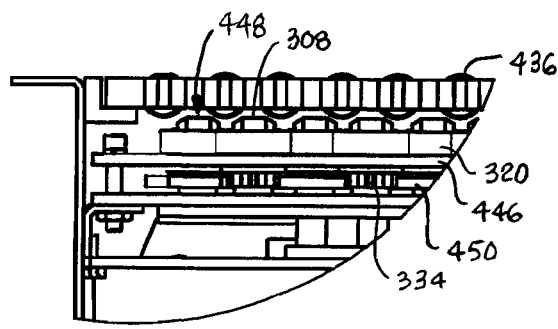
FIGS. 23 and 24 are enlarged views of a portion of a conveying system using the shiftable drive rollers of FIG. 22 in deactuated and actuated states.
Figure 24:
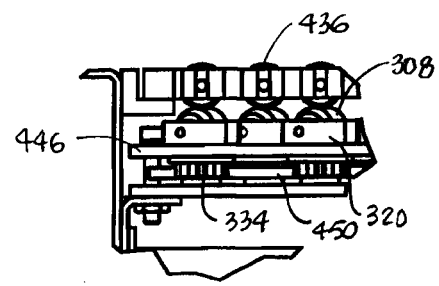

As shown in FIGS. 22-24, the rollers can be selectively actuated by laterally shifting the drive rollers relative to the belt rollers 436 with the roller drive mechanism. The roller cartridges 320 can be the same as those shown in FIG. 13. But the lower stems are not confined to merely pivoting motion in circular openings. Instead, the roller cartridges 320 are allowed to shift laterally as they pivot. A lateral row 442 of rollers is confined within an elongated lateral slot 444 in a fixed gear plate 446. One side of the slot 444 is bounded by the teeth of a rack gear 448. Just below the fixed gear plate 446 is a laterally shiftable gear plate 450 connected to an actuator (not shown). The shiftable gear plate has rack gears 452 formed on it parallel to and vertically offset from the rack gears in the fixed gear plate 446. The rack gears 452 of the fixed plate engage the cartridge gears 334 on opposite sides of the cartridge from the rack gears 448 the shiftable plate. So, as the actuator shifts the slidable plate laterally, as indicated by arrow 449, the cartridges 320 simultaneously pivot and translate along the slots 444 in the fixed plate 446. Because the belt rollers 436 are arranged in lanes extending longitudinally in the direction of belt travel, the lateral translation of the drive rollers 308 moves the drive rollers from an actuated position (FIG. 24), in which the drive rollers are pivoted at an oblique angle relative to the direction of belt travel and are shifted into contact with the belt rollers, to a deactuated position (FIG. 23), in which the drive rollers 308 are pivoted with their axes at an angle perpendicular to the direction of belt travel and to the axes of the belt rollers 436 and are shifted into spaces 448 between the longitudinal lanes of belt rollers and out of contact with them. To rotate the belt rollers 436 in the opposite diverting direction, the drive rollers 308 are shifted laterally into contact with the adjacent lane of belt rollers across the spaces. In this second actuated position, the cartridges 320 are pivoted to the opposite oblique angle from that of the first actuated position. In either actuated position, the outermost longitudinal lane of belt rollers 436 at one side of the belt or the other is out of contact with the drive rollers and freely rotatable. That's because the conveyor belt has one more lane of rollers 436 than columns 450 of drive rollers 308.

While particular embodiments have been disclosed in detail in the foregoing description and drawings for purposes of example, it will be understood by those skilled in the art that variations and modifications thereof can be made without departing from the scope of the disclosure.

What is claimed is:

1. A conveyor system comprising:
    a conveyor belt having a plurality of conveyor belt rollers configured to divert objects atop the conveyor belt rollers as the conveyor belt advances; and
    a roller drive mechanism including:
        a plurality of pivotable cartridges, each cartridge having a cartridge gear and a freely rotatable drive roller that contacts the conveyor belt rollers from below the conveyor belt;
        a plurality of actuator gears, each engaged with one of the cartridge gears to pivot the cartridges to change the orientation of the drive rollers with respect to the conveyor belt rollers and to move the drive rollers into and out of engagement with the conveyor belt rollers as a function of the orientation of the drive rollers with respect to the conveyor belt rollers; and
        an actuator moving the plurality of actuator gears to pivot the cartridges.

2. A conveyor system as in claim 1 wherein the actuator gears move the drive rollers out of engagement with the conveyor belt rollers when the drive rollers are oriented perpendicular to the conveyor belt rollers.

3. A conveyor system as in claim 1 wherein the actuator gears are rack gears engaging the cartridge gears along only one side of the cartridge gears.

4. A conveyor system as in claim 1 wherein the actuator gears are rack gears engaging the cartridge gears along opposite sides of the cartridge gears.

5. A conveyor system as in claim 1 wherein the roller drive mechanism includes:
    a plurality of fixed cam surfaces;
    a translatable gear plate disposed below the fixed cam surfaces and on which a plurality of the actuator gears are disposed to engage the cartridge gears;
    a cam follower on each of the pivotable cartridges forming a cam with a corresponding one of the fixed cam surfaces;
    wherein the actuator translates the gear plate to pivot the cartridges about vertical axes and drive the cam to raise and lower the pivotable cartridges as they pivot.

6. A conveyor system as in claim 5 wherein the fixed cam surfaces have ramped regions between lobes and valleys.

7. A conveyor system as in claim 5 wherein the cam followers include cam surfaces with a shape complementary with the shape of the fixed cam surfaces.

8. A conveyor system as in claim 1 wherein the actuator selectively shifts the pivotable cartridges laterally to move the drive rollers into and out of contact with the conveyor belt rollers and to pivot the pivotable cartridges about vertical axes.

9. A conveyor system as in claim 1 wherein the actuator gears include:
    a fixed gear engaging the cartridge gears on a first side;
    a translatable gear engaging the cartridge gears on an opposite second side;
    wherein the conveyor belt rollers are arranged in lanes; and
    wherein the actuator translates the translatable gear to pivot the pivotable cartridges about vertical axes and to shift the pivotable cartridges along the fixed gear to move the drive rollers into and out of contact with the lanes of conveyor belt rollers.

10. A conveyor system as in claim 9 wherein the roller drive mechanism includes a translatable plate coupled to the actuator and having a rack gear forming the translatable gear.

11. A conveyor system as in claim 1 wherein the roller drive mechanism selectively pivots the pivotable cartridges to one of three pivot angles: a first pivot angle in which the drive rollers are oblique to the conveyor belt rollers, a second pivot angle equal and opposite to the first pivot angle, and a third pivot angle in which the drive rollers are perpendicular to the conveyor belt rollers, and wherein the drive rollers are in contact with the conveyor belt rollers when the pivotable cartridges are pivoted to the first or second pivot angles and out of contact with the conveyor belt rollers when the pivotable cartridges are pivoted to the third angle.

12. A conveyor system comprising:
    a conveyor belt advancing in a direction of belt travel and having a plurality of conveyor belt rollers with axes of rotation parallel to the direction of belt travel; and
    a roller drive mechanism including:
        a plurality of pivotable cartridges, each cartridge having a drive roller freely rotatable about an axis of rotation and disposed below the conveyor belt;
        an actuator coupled to the plurality of pivotable cartridges to pivot the cartridges about a vertical axis to change the direction of the axes of rotation of the drive rollers and to move the drive rollers into and out of contact with the conveyor belt rollers.

13. A conveyor system as in claim 12 wherein the plurality of pivotable cartridges have cartridge gears and wherein the roller drive mechanism includes a plurality of actuator gears, each engaged with one of the cartridge gears to pivot the cartridges.

14. A conveyor system as in claim 12 wherein the roller drive mechanism includes a plurality of cams formed by fixed cam surfaces and cam followers on the pivotable cartridges that ride on the fixed cam surfaces as the actuator pivots the pivotable cartridges to raise and lower the drive rollers into and out of contact with the conveyor belt rollers.

15. A conveyor system as in claim 12 wherein the plurality of pivotable cartridges have cartridge gears and wherein the roller drive mechanism includes a fixed rack gear and a parallel translatable rack gear translated by the actuator, wherein the cartridge gears are engaged by the fixed rack gear and the translatable rack gear on opposite sides so that, as the actuator translates the translatable rack gear, the pivotable cartridges pivot while shifting laterally along the fixed rack gear to move the drive rollers into and out of contact with the conveyor belt rollers.

16. A roller drive mechanism for changing the direction of rotation of belt rollers in a conveyor belt advancing in a direction of belt travel, comprising:
    a plurality of pivotable cartridges, each cartridge having a cartridge gear and a freely rotatable drive roller that contacts belt rollers of a conveyor belt from below;
    a plurality of actuator gears, each engaged with one of the cartridge gears to pivot the cartridges to change the orientation of the drive rollers with respect to the belt rollers and to move the drive rollers into and out of engagement with the belt rollers as a function of the orientation of the drive rollers with respect to the belt rollers; and
    an actuator moving the plurality of actuator gears to pivot the cartridges.

17. A roller drive mechanism as in claim 16 further comprising a plurality of cams formed by fixed cam surfaces and cam followers on the pivotable cartridges that ride on the fixed cam surfaces as the actuator pivots the pivotable cartridges to raise and lower the drive rollers into and out of contact with the belt rollers.

18. A roller drive mechanism as in claim 16 wherein the plurality of pivotable cartridges have cartridge gears and wherein the actuator gears comprise a fixed rack gear and a parallel translatable rack gear translated by the actuator, wherein the cartridge gears are engaged by the fixed rack gear and the translatable rack gear on opposite sides so that, as the actuator translates the translatable rack gear, the pivotable cartridges pivot while shifting laterally along the fixed rack gear to move the drive rollers into and out of contact with the belt rollers.

\* \* \* \* \*